K. ALQUIST.
SPUR GEARING.
APPLICATION FILED SEPT. 1, 1915.

1,220,810.

Patented Mar. 27, 1917.
2 SHEETS—SHEET 1.

Inventor:
Karl Alquist,
by Albert G Davis
His Attorney.

K. ALQUIST.
SPUR GEARING.
APPLICATION FILED SEPT. 1, 1915.
1,220,810.
Patented Mar. 27, 1917.
2 SHEETS—SHEET 2.
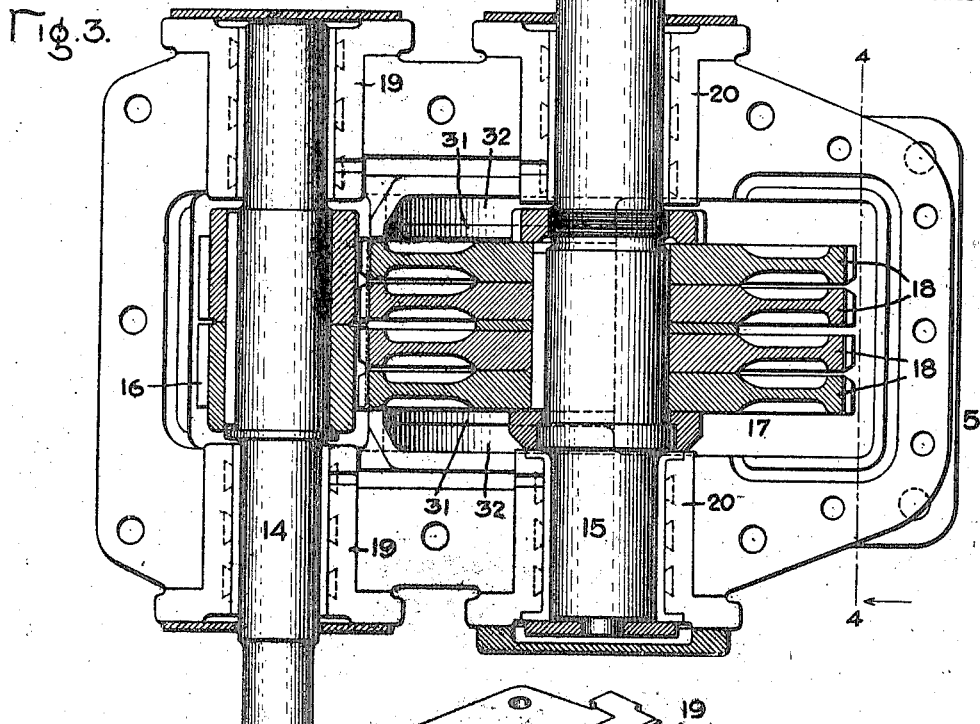
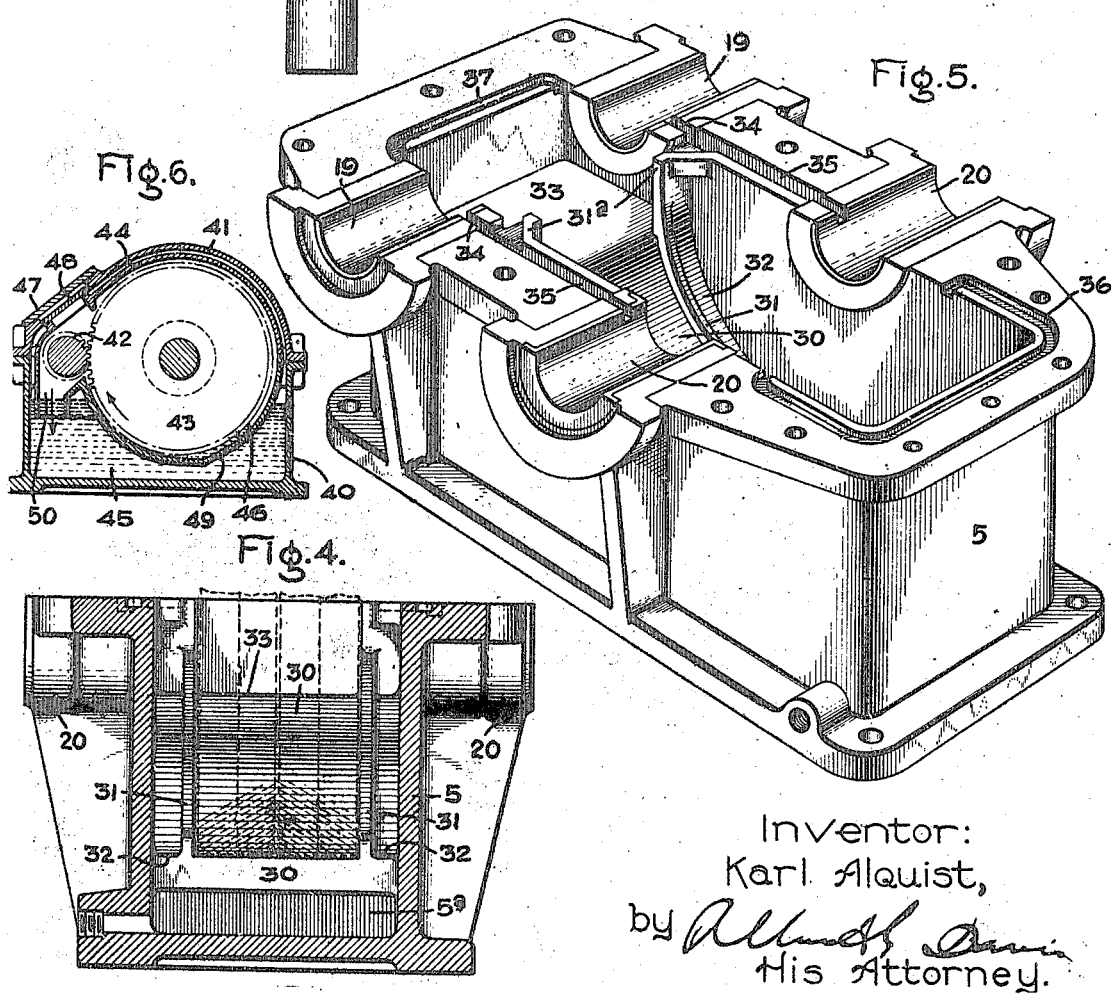
Inventor:
Karl Alquist,
by
His Attorney.

UNITED STATES PATENT OFFICE.

KARL ALQUIST, OF SCHENECTADY, NEW YORK, ASSIGNOR TO GENERAL ELECTRIC COMPANY, A CORPORATION OF NEW YORK.

SPUR-GEARING.

1,220,810.  Specification of Letters Patent.  Patented Mar. 27, 1917.

Application filed September 1, 1915. Serial No. 48,424.

*To all whom it may concern:*

Be it known that I, KARL ALQUIST, a subject of the King of Sweden, residing in Schenectady, county of Schenectady, State of New York, have invented certain new and useful Improvements in Spur-Gearing, of which the following is a specification.

The present invention relates to spur gearing, and particularly to the lubrication of the teeth or the teeth and bearings of spur gearing designed to run at relatively high speed and to transmit large loads.

In the operation of such gearing it is undesirable to lubricate the teeth by having the wheels or any part of them run in oil because of the losses due to the violent churning or pumping action produced by the gears on the oil, and one of the objects of my invention is to provide an improved lubricating arrangement for the teeth of meshing gears in which while a sufficient quantity of lubricant is always supplied to the gear teeth, no substantial part of them is required to run in oil, only the lowermost tips of the teeth touching it.

A further object of my invention is to provide a self-lubricating system for gearing, and particularly intended for high speed gearing, which is wholly inclosed within the gear casing, and which provides for lubricating both the gear teeth and the bearings. In this connection it is pointed out that a large amount of heat is generated by the bearings of such gearing, which it is necessary for the lubricant to absorb and convey away and that before the lubricant is again applied to the bearings it must be cooled. My improved lubricating system also embodies means likewise contained within the casing which acts as a cooling means for the lubricant. In other words, I provide a complete lubricating system for the gearing, which system is entirely contained within the gear casing.

For a consideration of what I believe to be novel and my invention, attention is directed to the accompanying description and the claims appended thereto.

Figure 1:
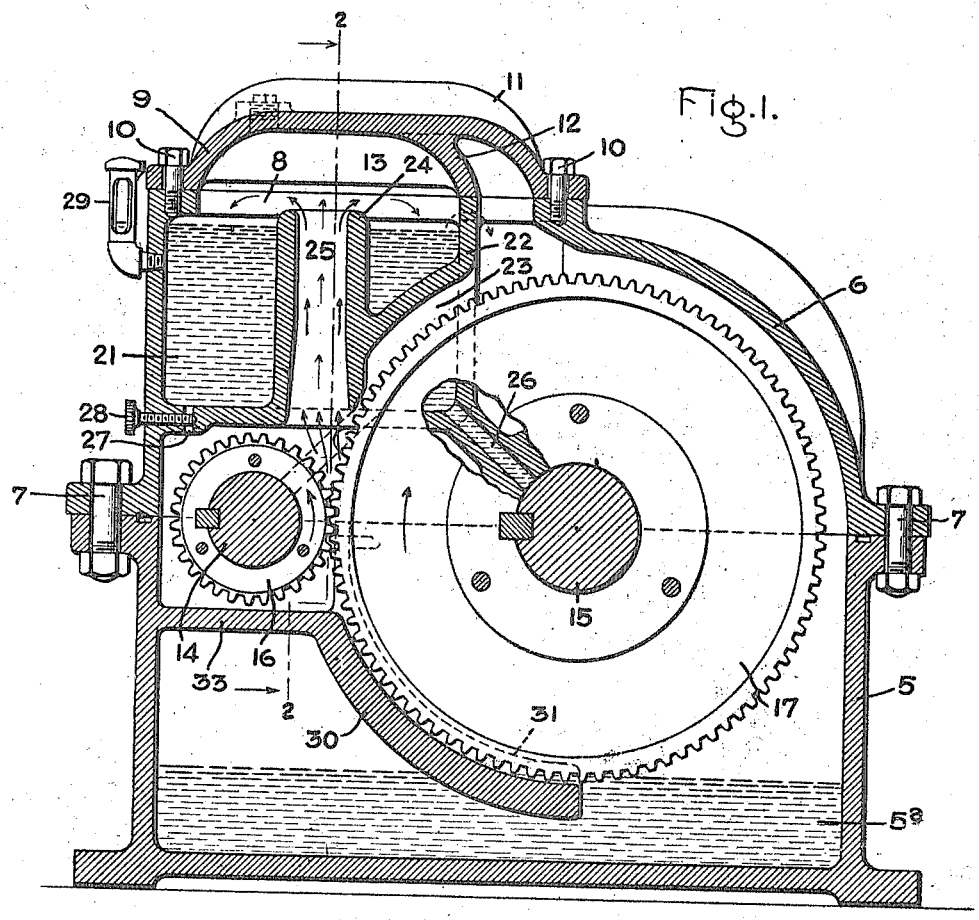
Figure 2:
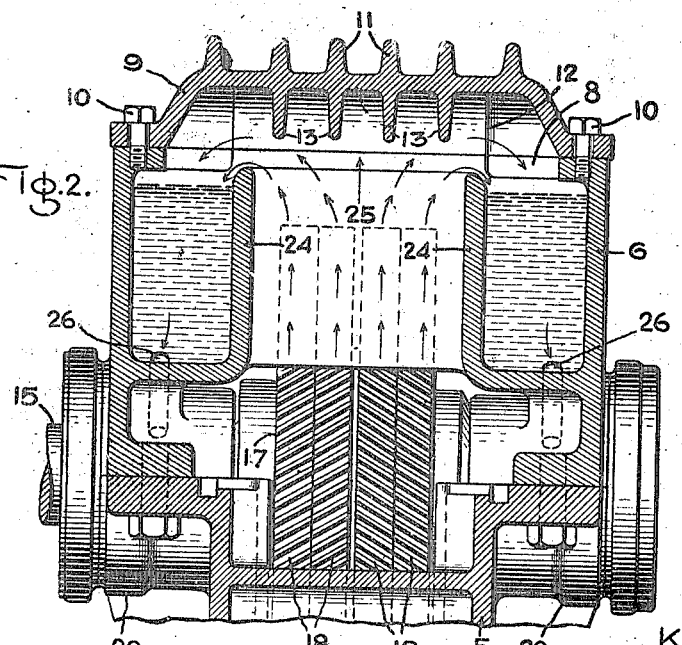

In the accompanying drawing, Figure 1 is a sectional view of the gearing embodying my invention; Fig. 2 is a sectional view taken on line 2—2, Fig. 1, looking in the direction of the arrows; Fig. 3 is a plan view, the upper half of the casing being removed and the gear wheels being shown in section; Fig. 4 is a sectional view of the lower portion of the casing and one of the gear wheels taken on line 4—4, Fig. 3; Fig. 5 is a perspective view of the lower half of the casing with the gear wheels removed; and Fig. 6 is a sectional view of a modification.

In carrying out my invention where I aim to lubricate the teeth only of the gearing, I provide a suitable reservoir in the casing to which lubricant is adapted to be pumped by the gear teeth, and which acts as a storage reservoir. I then connect this reservoir to what may be termed a second reservoir or lubricating chamber in which the gear wheels, or at least the lower portion of one of them runs, by means of one or more small conduits or passages which is, or are, of just sufficient size to feed an amount of lubricant from the storage reservoir to the other that when the gearing is running, the dipping or touching of the lowermost tips of the gear teeth in the lubricant will serve to pump it from this chamber back to the storage reservoir. In other words, the lubricant is fed from the storage reservoir to the lubricating chamber at such a rate that the gears keep it pumped out down to a level where just the tips of the teeth touch in the lubricant.

Where I desire to not only lubricate the gearing teeth from the lubricant in the casing, but also the bearings, I then arrange the storage reservoir for the lubricant above the bearings and pass the lubricant through the bearings on its way from the storage reservoir to the other reservoir or lubricating chamber. In this connection, I then also find it desirable to provide a cooling means for the lubricant during its circulation, as will be explained fully hereinafter.

Referring to the drawing, Figs. 1 to 5, where I have illustrated a gearing having a complete self-contained lubricating system for the teeth and bearings, and a cooling means, the casing of the gearing comprises a lower section 5 and an upper section 6 suitably joined together by bolts 7. The upper section is provided with an opening 8 to one side thereof, which is closed by a cover plate 9 fastened in place by bolts 10. This cover plate is curved as shown, and on its upper side is provided with a suitable number of ribs or fins 11. On the inner side it is provided with a curved depending plate 113

12 and a series of webs 13 which are preferably in line with the ribs or fins 11. The purpose of these parts will be pointed out hereinafter.

Mounted in the casing are the shafts 14 and 15 which carry the pinion 16 and gear wheel 17 respectively. Helical gears are illustrated and the gear wheel 17 is shown as being of the flexible or elastic type invented by me, and comprising a plurality of laminations or disks 18 suitably fixed on a shaft or support and slightly spaced apart at their periphery to permit of slight axial yielding under tooth pressure. The invention, however, is not limited to this type of gearing. The casing is provided with suitable bearings for these shafts, those for the shaft 14 being shown at 19, and those for the shaft 15 being shown at 20. Located inside the casing beneath the opening 8 and above pinion 16 and the adjacent side of wheel 17 is a lubricant containing reservoir 21. This constitutes the storage reservoir as referred to above. It is preferably rectangular and has its wall 22 shaped to accommodate the gear wheel 17 as indicated at 23. Extending up through the central part of the casing of reservoir 21 is a rectangular wall 24 which defines a passage 25 which is directly over the points where the teeth of the pinion 16 and gear wheel 17 mesh. The wall extends from the bottom of the reservoir to a point adjacent the top thereof. The passage 25 is of a width to extend to each side of the point where the teeth mesh, and is somewhat longer than the width of the gears, as shown in Fig. 2. The reservoir is connected to the bearings of the gear wheels by suitable passages 26 through which lubricant passes to them. It is also preferably provided with a bypass opening 27 regulated by a screw 28, Fig. 1. 29 indicates a suitable gage connected with reservoir 21 to indicate the level of lubricant therein. Extending across the lower portion 5 of the casing is a curved wall 30 which is shaped to conform to the curvature of the wheel 17 and has shallow side walls 31 (see Figs. 1 and 5) between which the wheel runs and which also define grooves 32 (Fig. 5) between them and the inside of the casing wall. The chamber 5$^a$ in the lower portion of the casing 5 forms in the present instance the second reservoir or lubricating chamber, as will be pointed out in connection with the operation.

In operation a suitable amount of oil is filled into the lower half of the gear casing, i. e., the lubricating chamber 5$^a$, and into the reservoir 21, the levels which it assumes in the two reservoirs not being material for if the gear is standing idle all or substantially all the lubricant will run through to the chamber 5$^a$. The gearing revolves in the direction indicated by the arrows and acts as a pump to pump lubricant from the casing up through passage 25 into the reservoir 17 from which it is fed to the bearings through passages 26. When the gearing is started it will quickly pump the lubricant from the chamber 5$^a$ up into the reservoir 21 and lower the level in this chamber to a point such that the gear teeth will dip into the lubricant to such an extent that the gearing will just pump the oil in the reservoir at the same rate at which it is fed to the bearings, it being understood, of course, that the oil from the bearings leaks back to the chamber 5$^a$. It will be understood that the design will be such that when running with the tips of the lowermost gear teeth just sweeping across the top of the lubricant, there will be pumped an amount of oil just equal to that which is running from the reservoir 21 through to bearings back to the lubricating chamber. Should it be found, however, that the amount of oil pumped is in excess of that used by the bearings, or in other words, that the oil does not run back through the bearings with sufficient rapidity, the screw 28 can be turned to regulate opening 27 so that a certain amount of oil may be led from the reservoir directly back to the chamber 5$^a$. Ordinarily however, this will not be necessary, as the oil running through the bearings will be sufficient to maintain the desired level in the lower chamber so that the teeth of the gear wheel dip into it to the desired depth. The wall 30 and side walls 31 act to keep the lubricant which the teeth of the gear 17 pick up from being thrown off again immediately (i. e., as a pump casing) and also prevent excessive agitation of the lubricant in the casing.

The lubricant pumped up by the gears and discharged through passage 25 will be in the form of a fine spray and fog, and it is desirable to condense this and separate the air out of it and at the same time cool it. It is for these purposes that the webs 11 are provided. The spray and fog from the passage 25 is thrown with considerable force against the top of the cover 9 between the webs 13. This tends to condense the fog and separate it and the spray out from the air, a goodly portion of it clinging to the cover and to webs 13 which also act in the capacity of surface condensers to further condense and separate out the lubricant. Owing to the curved shape of the cover, the spray and fog and the drops of lubricant will tend to flow toward the sides, the drops of lubricant dropping into the reservoir 21. When the spray and fog strikes the cover 9 its direction is changed, it being forced to flow down between the webs 13. This causes the air to separate out and flow under the lower edges of the webs 13 to the casing. This separates out the air in a very satisfactory manner. At the same time the webs absorb a large amount of heat from the lubricant, which heat is carried to the outside of the casing wall and dissipated. The ribs or fins 11 are for the purpose of assisting in this by providing additional radiating surfaces. The arrangement thus functions as a cooler and condenser for the lubricant and also as an air separator.

With the arrangement as described, it may happen when, for any reason, the gearing is running at a materially lower speed than that for which it is designed, as it may some times be called upon to do, although usually only for a short time, that the gear wheels will not pump the lubricant with sufficient force to throw it into the reservoir in sufficient quantities to supply the bearings, and under these conditions in order that the bearings may be lubricated, I provide an auxiliary or secondary lubricating means for them. To this end I provide a flat wall 33 which is preferably integral with the wall 30 and extends across the casing under the pinion 16. I also extend the side walls 31 up flush with the top surface of the lower half of the casing as indicated at 31ª. This as is best shown in Fig. 5, forms with the side walls of the casing a housing or chamber in which the pinion 16 runs. This chamber is connected with the bearings by means of grooves 34 and 35, in the top surface of the side walls of the lower half of the casing. When the gear is running at a low speed this chamber in which the pinion runs will become filled with lubricant up even with the top of the lower half of the casing and from here it will flow by way of passages 34 and 35 to the bearings, the excess lubricant flowing over the top of the extended walls 31ª back into the lower chamber by way of the grooves 32. This will sufficiently lubricate the bearings as when the gear is running at a relatively low speed a cooling means for the lubricant is not necessary since a much smaller amount of heat will be generated in the bearings. 36 and 37 indicate grooves which are formed in the lower half of the casing wall between the flanges. The purpose of these grooves is to prevent leakage of lubricant to the outside of the casing. Any lubricant leaking through between the two halves of the casing will run into these grooves and thence back into the interior thereof.

Referring now to Fig. 6, I have here illustrated an embodiment of my invention which is designed for lubricating the teeth only of the gearing. Under these circumstances the bearings would be lubricated by some other means, as by a lubricant forced through them under pressure. In this arrangement although the storage reservoir for the lubricant could be arranged above the bearings, there is no necessity for it, so I preferably locate it in the lower half of the gear casing, as this is simpler, and form the lubricating chamber by means of a wall which incloses the gear wheels and is provided with suitable openings for the circulation of the lubricant. 40 indicates the lower half of the gear casing and 41 the upper half, the two gear wheels being designated 42 and 43 respectively. Inside the gear casing is a wall 44 which may wholly or partially surround the gear wheels and which defines the storage reservoir 45 and the lubricating chamber 46. It may be formed either integral with or separate from the gear casing proper. In the present instance it is shown as being formed separately and as wholly surrounding the gear wheels to form in effect a second or supplementary casing, as this arrangement has the advantage of deadening the noises of the gearing. 47 and 48 indicate covers for openings in the casing member 41 and in wall 44. The storage reservoir 45 is connected to the lubricating chamber 46 by one or more passages 49 in wall 44 through which lubricant flows from the former to the latter. They are also connected by a passage 50 for the return of the lubricant to reservoir 45 after it has been used to lubricate the gear teeth. The operation of this arrangement is the same as that already described in connection with Figs. 1 to 5. With the gearing standing, the level of the lubricant in the reservoir 45 and chamber 46 will be the same. When the gearing is started, the lubricant from chamber 46 will be quickly pumped over through passage 50 to the reservoir 45, until a level is reached in chamber 46 where the lubricant will be pumped out at the same rate that it is flowing in through opening or openings 49. This level will then, of course, be maintained. The opening or openings 49 is or are of such size that the correct amount of lubricant will be fed through to lubricate the teeth, and this will require that only the lowermost tips of the teeth of the one gear wheel shall touch the surface of the lubricant, and that consequently the wheels are not required to run directly in the lubricant.

It will be understood that an arrangement for also lubricating the bearings (such for example as is shown in Figs. 1 to 5) could be combined with the specific arrangement for lubricating the teeth as shown in Fig. 6 if found desirable. Or, on the other hand, the arrangement of Figs. 1 to 5 might be modified to lubricate the gear teeth only.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. In a gearing, the combination of a casing, meshing gear wheels therein, means defining within the casing a chamber for containing a supply of lubricant, and a chamber in which at least one of the gear wheels runs, conduit means which connect said two chambers to supply lubricant from the first named chamber to the second, and conduit means through which the gear wheels pump the lubricant from the second named chamber to the first.

2. In a gearing, the combination of a casing having two chambers therein for containing lubricant, the gear wheels when in operation acting to pump the lubricant from one chamber to the other, and conduit means for feeding the lubricant from the last named chamber back to the other chamber at a predetermined rate.

3. In a gearing, the combination of a casing having two chambers therein for containing lubricant, the gear wheels when in operation acting to pump the lubricant from one chamber to the other, conduit means for feeding the lubricant from the last named chamber to the other at a predetermined rate, and means within the casing for cooling the lubricant.

4. In a gearing, the combination of a casing, shafts having bearings, meshing gear wheels on said shafts, means defining with the casing two lubricant containing chambers, one of which is located above the bearings and to which lubricant is pumped from the other by the gear wheels, and conduits connecting the chamber which is located above the bearings to said bearings to lubricate them, the lubricant after passing through said bearings being returned to the other chamber.

5. In a gearing, the combination of a casing, shafts having bearings, meshing gear wheels on said shafts, means defining with the casing two lubricant containing chambers, one of which is located above the bearings and to which lubricant is pumped from the other by the gear wheels, conduits connecting the chamber which is located above the bearings to said bearings to lubricate them, the lubricant after passing through said bearings being returned to the other chamber, and means within the casing for cooling the lubricant.

6. In a gearing, the combination of a casing, shafts having bearings, meshing gear wheels on said shafts, a lubricant containing reservoir above the bearings, conduits connecting it to bearings for lubricating them, a chamber within the casing to which the lubricant from the bearings flows, and from which it is pumped by the gear wheels, and conduit means including a cooling device through which the lubricant pumped by the gears is returned to the reservoir.

7. In a gearing, the combination of a casing, shafts, bearings therefor, meshing gear wheels in the casing carried by the shafts, a lubricant reservoir, means forming a passage leading from the point where the gear wheels mesh to the lubricant reservoir, means forming passages for conveying lubricant from the reservoir to the shaft bearings, and a lubricant containing chamber in the casing to which the lubricant after it passes through said bearings flows and from which it is pumped by the gear wheels back through the first named passage means to the reservoir.

8. In a gearing, the combination of a casing, shafts, bearings therefor, meshing gear wheels in the casing carried by the shafts, a lubricant reservoir in the casing above the point where the gear wheels mesh, a wall forming a passage extending from the bottom of the reservoir to a point adjacent its top, said passage being located directly over the meshing point of the gear wheels, means forming conduits for conveying lubricant from the reservoir to the shaft bearings, and a lubricant containing chamber in the casing to which the lubricant after it passes through said bearings flows and from which it is pumped by the gear wheels back through the passage formed by said wall to the reservoir.

9. In a gearing, the combination of a casing, bearings carried thereby, shafts in said bearings, a pinion and gear wheel mounted on said shafts, a lubricant reservoir in the casing above the pinion and adjacent portion of the gear wheel, said casing being formed with an opening above the reservoir, a wall forming a passage extending from the bottom of the reservoir to a point adjacent its top, said passage being located over the meshing point of the pinion and gear wheel, a curved cover for the opening in the casing, means forming conduits for conveying lubricant from the reservoir to the shaft bearings, and a lubricant containing chamber in the casing to which the lubricant after it passes through said bearings flows and from which it is pumped by the gear wheels back through the passage formed by said wall to the reservoir.

10. In a gearing, the combination of a casing, bearings carried thereby, shafts in said bearings, a pinion and gear wheel mounted on said shafts, a lubricant reservoir in the casing above the pinion and adjacent portion of the gear wheel, said casing being formed with an opening above the reservoir, a wall forming a passage extending from the bottom of the reservoir to a point adjacent its top, said passage being located over the meshing point of the pinion and gear wheel, a curved cover having web members on its inner side which fits over the opening in the casing, means forming conduits for conveying lubricant from the reservoir to the shaft bearings, and a lubricant containing chamber in the casing to which the lubricant after it passes through said bearings flows and from which it is pumped by the gear wheels back through the passage formed by said wall to the reservoir.

11. In a gearing, the combination of a casing, bearings carried thereby, shafts in said bearings, gear wheels mounted on said shafts, a lubricant reservoir in the casing above the gear wheels, said casing being formed with an opening above the reservoir, a wall forming a passage which extends from the bottom of the reservoir to a point adjacent the top thereof, said passage being located over the meshing point of the gear wheels, a curved cover having web members on its inner surface and heat radiating ribs on its outer surface which fits over the opening in the casing, means forming passages for conveying lubricant from the reservoir to the shaft bearings, and a lubricant containing chamber in the casing to which the lubricant after it passes through said bearings flows and from which it is pumped by the gear wheels back through the passage formed by said wall to the reservoir.

12. In a gearing, the combination of a casing, bearings therein, shafts in said bearings, meshing gear wheels on the shafts, a lubricant containing reservoir located above the bearings, conduits connecting it to the bearings to lubricate them, a chamber in the casing to which the lubricant from the bearings flows, and from which it is pumped by the gear wheels to the reservoir, and supplemental means for lubricating the bearings when the gear wheels are not running at sufficient speed to pump the lubricant to the reservoir.

13. In a gearing, the combination of a casing, bearings therein, shafts in said bearings, meshing gear wheels on the shafts, a lubricant containing reservoir located above the bearings, conduits connecting it to the bearings to lubricate them, a chamber in the casing to which the lubricant from the bearings flows, and from which it is pumped by the gear wheels to the reservoir, and a chamber below the reservoir and connected with the bearings to which lubricant is pumped and from which it is fed to the bearings when the gear wheels are not running at sufficient speed to pump the lubricant to said reservoir.

14. In a gearing, the combination of a casing, bearings therein, shafts in the bearings, meshing gear wheels on said shafts, a lubricant containing reservoir, conduits connecting it to the bearings to lubricate them, a chamber in the casing to which the lubricant flows from the bearings, one of said gear wheels running in said chamber so that the tips of its teeth pick up lubricant to lubricate such teeth, a cooling and condensing means in the casing, a conduit for conveying the lubricant thrown off by the gear wheels to such means, and means for conveying the lubricant from it to the reservoir.

In witness whereof, I have hereunto set my hand this 30th day of August 1915.

KARL ALQUIST.